United States Patent
Magée (10) Patent No.: US 6,509,979 B2
(45) Date of Patent: *Jan. 21, 2003

(54) PRINTING METHOD USING INTER-PIXEL BLENDING ON AN ABSORBENT SUBSTRATE

(75) Inventor: Ronald Magée, LaGrange, GA (US)

(73) Assignee: Milliken & Company, Spartanburg, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,795

(22) Filed: Apr. 3, 1997

(65) Prior Publication Data

US 2001/0012109 A1 Aug. 9, 2001

(51) Int. Cl.[7] ............................................. G06F 15/00
(52) U.S. Cl. .................... 358/1.9; 358/502; 358/515; 358/518; 358/520; 345/603; 345/604; 347/43; 347/100; 347/105; 347/171
(58) Field of Search ................... 395/350, 109, 395/1.9, 101, 1.5, 61, 103; 358/455, 502, 515–520, 1.9; 347/43, 171–178, 100, 105; 428/323

(56) References Cited

U.S. PATENT DOCUMENTS

| | | | |
|---|---|---|---|
| 3,942,342 A | 3/1976 | Klein et al. ................. 68/205 |
| 3,969,779 A | 7/1976 | Stewart, Jr. .................. 8/149 |
| 4,635,078 A | 1/1987 | Sakurada et al. .............. 347/15 |
| 4,672,432 A | 6/1987 | Sakurada et al. ............ 358/534 |
| 4,686,538 A | 8/1987 | Kouzato ...................... 347/15 |
| 4,695,846 A | 9/1987 | Suzuki ....................... 347/100 |
| 4,710,784 A | 12/1987 | Nakayama .................... 347/15 |
| 4,959,659 A | 9/1990 | Sasaki et al. ................. 347/43 |
| 4,967,203 A | 10/1990 | Doan et al. .................... 347/41 |
| 4,984,169 A | 1/1991 | Johnson, Jr. ............ 364/469.01 |
| 5,012,257 A * | 4/1991 | Lowe et al. ................... 347/43 |
| 5,128,876 A | 7/1992 | Cox ...................... 364/470.04 |
| 5,136,520 A * | 8/1992 | Cox ............................ 700/133 |
| 5,142,481 A | 8/1992 | Cox ...................... 364/470.04 |
| 5,195,043 A | 3/1993 | Varner .................... 364/470.04 |
| 5,208,592 A | 5/1993 | Johnson, Jr. ................. 341/63 |
| 5,255,350 A | 10/1993 | Hermann et al. ........... 395/109 |
| 5,416,612 A | 5/1995 | Ingraham et al. ........... 358/501 |
| 5,428,720 A * | 6/1995 | Adams, Jr. ................... 345/604 |
| 5,570,118 A * | 10/1996 | Rezanka et al. ............... 347/43 |
| 5,589,259 A * | 12/1996 | Hosoi et al. ................. 428/323 |
| 5,596,352 A * | 1/1997 | Bliss et al. .................... 347/15 |
| 5,600,352 A * | 2/1997 | Knierim et al. ............... 347/40 |
| 5,700,317 A * | 12/1997 | Adamic .................... 106/31.58 |
| 5,764,261 A * | 6/1998 | Koike et al. ................. 347/100 |
| 5,767,876 A * | 6/1998 | Koike et al. .................. 347/43 |
| 5,796,929 A * | 8/1998 | Shu et al. .................... 395/109 |
| 6,033,066 A * | 3/2000 | Koike et al. ................. 347/101 |

* cited by examiner

Primary Examiner—Jose L. Couso
Assistant Examiner—Gregory Desire
(74) Attorney, Agent, or Firm—Terry T. Moyer; George M. Fisher (57) ABSTRACT

A method for printing an image on an absorbent substrate using liquid colorants. The colorants are assigned to pixel groups on the substrate surface that define the image. Some colorants are applied to pixels in quantities that exceed the absorption capacity of the substrate. These colorants migrate into adjoining pixels, blending with other colorants in those pixels and forming new, otherwise unavailable colors.

37 Claims, 3 Drawing Sheets

| 107%A | 107%A | 107%A |
|---|---|---|
| 107%A | 45%B | 107%A |
| 107%A | 107%A | 107%A |

| 93%A | 93%A | 93%A |
|---|---|---|
| 93%A | 120%A 45%B | 93%A |
| 93%A | 93%A | 93%A |

| 90%A | 90%A | 90%A |
|------|------|------|
| 90%A |  180%B | 90%A |
| 90%A | 90%A | 90%A |

| 80%A | 80%A 45%B | 80%A |
|------|------|------|
| 80%A 45%B | 80%A | 80%A 45%B |
| 80%A | 80%A 45%B | 80%A |

| 90%A | 70%A 40%B |
|------|------|
| 70%A 40%B | 90%A |

PRINTING METHOD USING INTER-PIXEL BLENDING ON AN ABSORBENT SUBSTRATE

BACKGROUND OF THE INVENTION

This invention relates generally to a method for printing a variety of colors on an absorbent substrate with a limited number of colorants. More specifically, this invention relates to a method to extend the perceived range of colors that can be printed on a substrate beyond those that are available using conventional printing methods. This method has particular utility when used with patterning systems that produce an image made up of a number of individual pixels to which individual quantities of colorants can be applied in accordance with a pre-defined patterning scheme.

To assist in the explanation of the operation and utility of this invention in its various embodiments, the following terms and definitions shall be used. As used herein, the term "color" shall encompass the concepts of hue, value or lightness, and chroma or saturation. The term "perceived color" shall mean the color perceived by a human observer at a distance at which individual pixels (as that term is defined herein) are not readily discernable. The term "pixel" shall be defined herein as the smallest area on the substrate onto which a controlled amount of colorant can be assigned with precision. This term is distinguishable from the term "pattern element." As used herein, the term "pattern element" shall refer to a single pixel, but shall also refer to a group of two or more pixels that are used, as a group, to form a pattern. Pattern elements may be arranged on a substrate surface in a tiled configuration (i.e., in abutting relationship with adjacent elements, with no gaps and no overlaps between adjacent elements) to form a pattern or image. The term "pixel area" shall refer to a specific area on a substrate that comprises a pixel. The term "colorant" shall mean a liquid, readily flowable ink, dye, or other liquid coloring agent. This term is also intended to include a diluent that has no intrinsic color of its own. Accordingly, the term "color" as applied to a colorant used to practice this invention can include a "colorless" colorant that is used as an in situ diluent on the substrate. The term "available color" shall mean the perceived color resulting from the application of a single colorant to a set of pixels on an uncolored (white) absorbent substrate. The term is intended to distinguish these perceived colors, which can be obtained by using readily available colorants and no blending processes, from physically or optically blended colors. The term "physically blended color" refers to a color that is the result of a physical mixing of two or more different available colorants on the substrate, resulting in the in situ formation of a colorant with a color different from the constituent colorants. A perceived color that is produced using a diluent is a physically blended color. The term "optically blended color" refers to the perceived color that is generated by the juxtaposition or arrangement (including overlap) on the substrate of different colorants, none of which are individually distinguishable at a distance. The term "blended color" refers to either or both of these types of colors. The term "compound pixel" refers to at least two adjacent pixels, each of which are differently colored (either with an available color or with a color resulting from the physical mixing of two or more colorants applied to that pixel). The term "metapixel" refers to a group of two or more adjoining or contiguous pixels, in which at least one of the pixels has been oversaturated with colorant (i.e., the quantity of colorant within the substrate area defining that pixel—the pixel area—exceeds the absorptive capacity of the substrate within that pixel area) and at least one other pixel in the group has been undersaturated with a different colorant (i.e., the quantity of colorant within the substrate area defining that pixel area is less than the absorptive capacity of the substrate within that pixel area). As a result, colorant migration occurs within the metapixel from an oversaturated pixel area to one or more adjoining or contiguous pixel areas that were undersaturated. This pixel-to-pixel migration leads either to physical blending with, or displacement of, colorants in the adjacent pixel areas, and is a characteristic of the metapixels of this invention. Other terms shall be introduced and defined as required.

Imaging or printing systems that use the concept of pixels to place images on substrates are in common use in the printing and textile industries, and have been the subject of numerous research and development efforts. Among such systems are those capable of patterning substrates using discrete points of colorant. These points are familiar to many as the small "dots" that make up the illustrations found in newspapers and magazines printed using the gravure printing process. In that process, the printed images are comprised of many small dots of colorant, each assigned to a separately defined, specific area or pixel. The larger the colorant dot assigned to that pixel, the more effectively that pixel will influence the overall perceived color of the image containing that pixel. By varying the dot size assigned to the various pixels, it is possible to reproduce colors that are not directly represented by the available colorants. For example, a green area on a substrate can be effectively reproduced using only blue and yellow dots, or an orange area using only magenta and yellow dots. Use of this technique is not limited to gravure, but is also commonly employed in lithographic and other systems using half-tone imaging.

In these cases, the different colored dots are readily seen at very close range as separate blue, yellow, or magenta dots, but at a distance are perceived as the desired color, even though that color exists nowhere on the substrate. Alternatively, the dots may overlap and visually mix— perhaps a blue or magenta dot is seen "through" an overlapping yellow dot—so that some dots actually appear on the substrate at very close range as an optically blended color. It is important to note, however, that even in these cases where the dots overlap to form an optically blended color (similar to making colors using overlapping transparent films of different colors), the individual colorants applied to the substrate remain in discrete, intact units that can be visually identified. No physical mixing or blending takes place between the contiguous or overlapping dots, and no migration or displacement of colorant takes place between adjacent pixels.

The textile industry has been using pixel-based printing techniques for a number of years for the purpose of generating multi-colored images on various absorbent textile substrates. Examples of such printing techniques used by the assignee are described in U.S. Pat. Nos. 3,942,342; 3,969,779; 4,894,169; 5,128,876; 5,136,520; 5,142,481; 5,195,043; and 5,208,592, all of which are hereby incorporated by reference as if expressly set forth herein. These latter systems use a plurality of liquid colorant applicators that selectively apply pulsed streams of colorants onto a moving absorbent substrate. The applicators are arranged along one of several linear arrays that are positioned in parallel relationship across the path of the moving substrate. A different liquid colorant is supplied to each array. As the substrate passes under a given array, the liquid colorant associated with that array is delivered to the substrate from one or more applicators in the form of a metered stream that is directed to an individual pixel on the substrate. Colors that require blending (e.g., the green or orange discussed above, assuming those colors are not among the available colorants) are reproduced by placing the appropriate colors in adjacent pixels, so as to generate an optical blend of the proper color, or by placing separately two (or more) different colorants within the same pixel, so as to generate a physical blend within the same pixel.

Each applicator in a given array is equipped to deliver no colorant, or a variable amount of the colorant associated with that array. The amount of colorant delivered to each pixel is controlled by patterning information sent by a patterning computer to each applicator—carefully timed "on" and "off" instructions that effectively form a pulsed stream of colorant that delivers the appropriate quantity of colorant to the designated pixel. A limitation in the use of such "duration-controlled" applicators arises from the inability of the applicators in a given array to initiate and then halt the flow of colorant within an extremely short time (thereby forming an extremely short pulse of liquid colorant). While the process described above controls colorant quantity within a pixel by controlling the duration of colorant flow, and not by varying the flow rate or orifice characteristics of the individual applicators, this invention is nevertheless applicable to other application methods using liquid colorants in which flow rate, flow character, or other means to meter colorant onto the substrate surface may be controlled, so long as there exists an inability to deliver an extremely small quantity of colorant to a designated pixel on the substrate surface. For convenience, this specific limitation shall be referred to herein as the microdelivery limitation.

As a practical matter, the micro-delivery limitation makes it impossible to reproduce any of those colors requiring the blending of colorants assigned to different arrays where the proportion of colorant needed to reproduce accurately the desired color is below the minimum quantity of colorant that the applicator physically can deliver. This limitation can also result in an inability to reproduce a color that requires the application of only a single colorant, but that must be applied so sparingly that the applicator cannot meter the colorant in such a small quantity. An example is printing a very pale blue color for which the only source of blue is a colorant that has an intrinsic dark blue color.

A known method to reduce these shortcomings is through the generation on the substrate of a repeating pattern of a set of two or more pixels, each pixel being assigned different, readily reproducible color. This set of pixels is then used in the same manner as a pixel, i.e., it is duplicated and positioned on the substrate to form the desired pattern and color. Because it is used in the manner of a pixel—to form a visually imperceptible individual unit of color from which the overall image is constructed—but is comprised of two or more adjacent pixels, this set of pixels shall be referred to as a compound pixel. The use of compound pixels can be reasonably effective in expanding somewhat the range of perceived colors that can be printed using a limited number of available colorants. This concept can be implemented using any of several arrangements of individual pixels within the compound pixel, e.g., a checkerboard, dither, or some other arrangement scheme.

This method, however, is of little utility if the ability to place very small quantities of colorant within a pixel is limited. Often in such cases, attempts at constructing and arranging pixels to form blends results in images that, when viewed, may be perceived as having the desired color, but also exhibit unintended and undesirable patterning artifacts, such as stipple, spots, mottling, heather, or moire. Such artifacts are particularly objectionable when, in order to construct the appropriate compound pixel yielding the desired color, individual pixels containing contrasting colors must be used. For example, it may be necessary to use a compound pixel comprised of a magenta and a green in a small checkerboard array in order to construct a perceived color that most closely represents the desired color, rather than using two or more colors that are less contrasting. However, by using such contrasting colors, the resulting visual "blend" is much more likely to be burdened with undesirable patterning artifacts as a result of the pixel geometry and the mechanisms of visual perception.

The invention disclosed herein overcomes the micro-delivery limitation in a way that is not shown or suggested in the prior art, and provides for a greatly expanded palette of colors than can be produced from a relatively small number of colorants. This result is achieved by simulating, without actually delivering, the low quantity of colorant that would otherwise be necessary to achieve the desired perceived color on an absorbent substrate. In addition, this invention also can minimize the distracting pattern artifacts that are common among prior art techniques.

If the quantity of colorant applied to a pixel area exceeds the ability of the substrate to absorb it, effectively oversaturating that pixel area, some quantity of colorant will diffuse or migrate beyond the boundaries of the pixel area and occupy a portion of an adjacent pixel area that is undersaturated. This migration of colorant will cause either a displacement of the color in an adjacent pixel area or a physical blending with the color in an adjacent pixel area. This migration can occur from pixel to pixel within a group of adjoining or contiguous pixels, as well as outwardly beyond the edge of the group, thereby causing colorant displacement or blending in areas immediately adjacent to the group. Groups of adjoining or contiguous pixels containing at least one oversaturated pixel area and at least one adjoining or contiguous undersaturated pixel area, and which exhibit pixel-to-pixel colorant migration, have been previously defined as metapixels. It has been found that the use of metapixels to form printed images has the unexpected effect of providing for the simulation of colorant dots of a much smaller size (by providing pixels that appear to contain much less of a given colorant) than is possible with single or compound pixel techniques.

Because it is frequently undesirable to oversaturate large areas of the substrate with colorant, the quantity of colorant directly applied to the adjacent pixels can be adjusted to accommodate the inter-pixel colorant migration in order to maintain the desired degree of average local substrate "wet out" or saturation. This level is usually "100%" or full saturation without oversaturation, a level which generally assures full colorant penetration and maximum "cover." It should also be noted that, in addition to oversaturating certain pixels with a single colorant, it is possible to achieve an oversaturated condition using partially saturating applications of two or more colorants within the same pixel. Doing so will cause an interpixel migration of a combination of colorants, and can again create color blends that are beyond existing color generating techniques. Similarly, partially saturating applications of two or more colorants can also be assigned to a pixel that remains undersaturated, as artistic considerations may require.

It is also contemplated that the physical placement or arrangement of the individual component pixels—including those that are oversaturated or undersaturated—within the metapixel need not be fixed, but can be varied as needed to assist in emphasizing pattern boundaries, adjusting pattern definition, or for other reasons. The skillful construction and arrangement of th e metapixel—including the adept choice of the initial colorants used, careful selection of the nature and degree of colorant oversaturation and migration employed, and the judicious placement and optimal systematic rearrangement of the individual pixels within the metapixel—can greatly expand the effective color palette possible from a given number of available colors and a limited ability to apply small quantities of colorant. This invention yields far more perceived colors that would otherwise be possible using conventional techniques. As an additional benefit, the patterning artifacts associated with conventional techniques, noted above, can be dramatically reduced or eliminated.

The above discussion is a summary of certain deficiencies in the prior art and certain advantages of the instant invention. Other advantages will be apparent to those skilled in the art from the detailed description of the invention that follows, which description includes exemplary embodiments, as well as exemplary drawings as briefly described below.

BRIEF DESCRIPTION OF THE DRAWINGS

In FIG. 1A, the image is formed using convention pixel techniques, without the use of a metapixel; in FIGS. 1B through 1E, the same color is simulated using metapixels of two different designs.

In FIG. 2A, the color is formed using convention pixel techniques, without the use of a metapixel; FIGS. 2B through 2G represent various alternative metapixels which, at a suitable viewing distance, effectively simulate the color depicted in FIG. 2A.

FIG. 3 is intended to assist in explaining the potential increase in the number of perceived colors that can be produced using metapixel techniques.

DESCRIPTION OF PREFERRED EMBODIMENTS

A discussion of the details and preferred embodiments of this invention will begin with reference to conventional pixel-based printing processes. As discussed earlier, such processes rely on the placement of many small dots of various sizes to define the desired image. If the image contains color, the assignment of dots of different colors to various pixels can often generate the desired color through the optical blending of colors, even if the desired color is not directly represented by the available colorants. Of course, this technique also is used with a black colorant to generate a range of grays for reproduction of black and white images on white substrates.

In the course of generating optically blended colors in such systems, a problem exists when a desired blended color requires a dot size that is smaller than the printing system is capable of generating. For example, if a strongly yellow-biased green is desired, and the only colorants available for use are blue and yellow, it may be impossible to generate the desired color because of an inability by the printing system to apply the requisite small quantity of blue colorant.

A similar problem exists with systems that use physical blending of colorants to generate colors on the substrate. The pixel-based printing systems used by the textile industry, referenced above, are good examples of such systems, even though such systems frequently use some optical blending techniques as well. Where physical blending is employed, the problem is analogous, except that, instead of a limit on minimum dot size, there exists a limit on the minimum quantity of colorant that can be applied within an individual pixel area for mixing purposes.

Figure 1A:
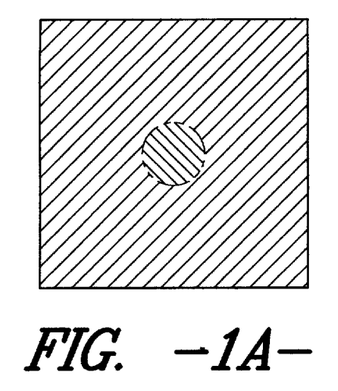
FIGS. 1A through 1E depict an enlargement of a color imaged area of an absorbent substrate such as a textile substrate requiring only 5% contribution of an available colorant.
Figure 2A:
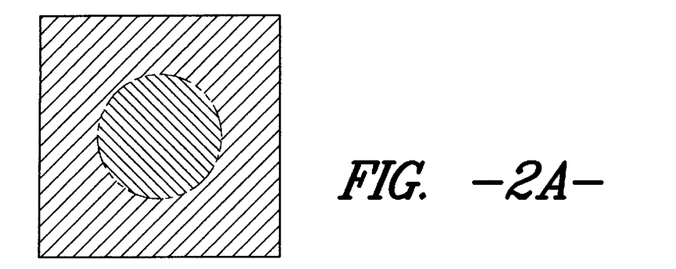
FIGS. 2A through 2G depict an enlargement of a color imaged area of an absorbent substrate such as a textile substrate requiring a 20% contribution of an available colorant.
Figure 2B:
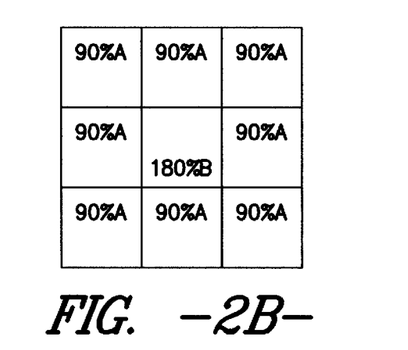
Figure 2C:
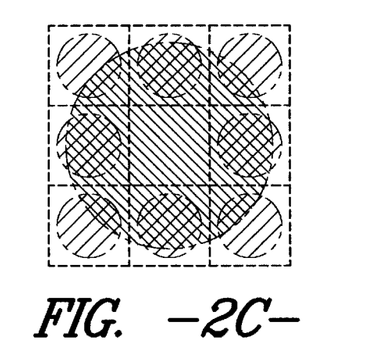
Figure 2D:
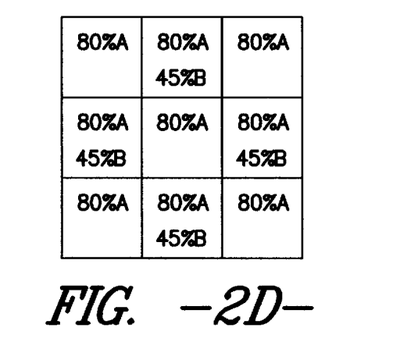
Figure 2E:
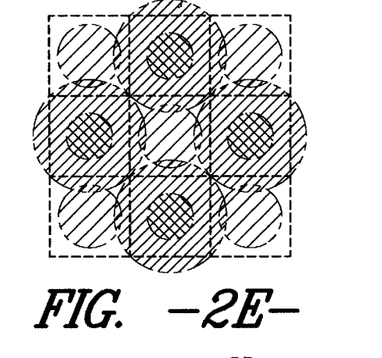
Figure 2F:
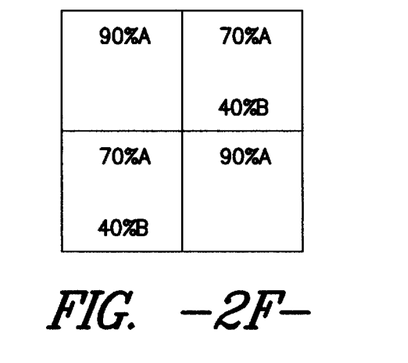
Figure 2G:
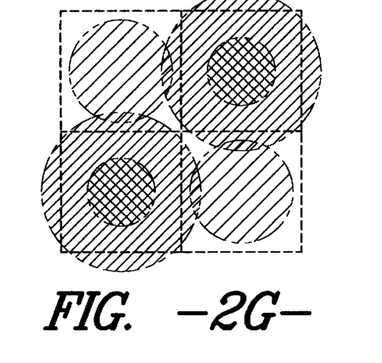

FIGS. 1A and 2A are intended to illustrate two different dot sizes that might be required in a pixel-based process. The "frame" surrounding the dot represents a standard pixel area, i.e., it is the smallest area on the substrate to which a controlled quantity of colorant can be directed with accuracy and precision. (This should not be confused with the smallest area on the substrate to which a controlled quantity of colorant can be applied. The latter would necessarily be dependent on the quantity and viscosity of the colorant, as well as other factors.) Note that all pixels discussed herein are assumed to occupy identically-sized areas on the substrate surface.

As indicated, FIGS. 1A and 2A depict dots that comprises about 5% and about 20%, respectively, of the surface area of the pixel. It shall be assumed in the following discussion that a computer-controlled liquid colorant injection system similar to that described above is to be used to print an image requiring the visual equivalent of these 5% and 20% pixels, and that equipment limitations prevent the application of any quantity of colorant that would result in color covering less than 40% of the pixel area.

The exact value of this lower threshold would depend upon the "dwell time" of the substrate under the colorant applicators, the absorption characteristics of the substrate, the desired pixel size, the response characteristics of the applicators, and other factors. In physical blending systems such as assumed here, this 40% value is assumed to correspond to a quantity of colorant that represents 40% of the absorptive capacity of the substrate lying within the boundaries of the pixel. Generally, such systems strive for a 100% average saturation level (i.e., full saturation of the substrate without oversaturation) to maximize colorant "cover" and penetration. In the following discussion, this 100% average saturation level shall be assumed as the preferred overall saturation level across the substrate. However, this invention does not require any specific overall average level of saturation. The assumption of a 40% lower threshold means that neither of the pixels depicted in FIGS. 1A and 2A could be reproduced directly with the assumed equipment. The remaining Figures will describe how the pixel can, nevertheless, be effectively simulated on an absorbent substrate using the metapixels of this invention.

Figure 1B:
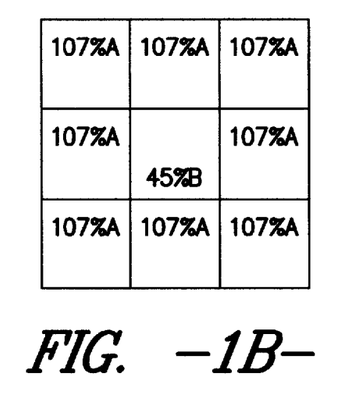

FIG. 1B represents one example of a metapixel that could be used to simulate a color requiring use of a "5%" pixel. As shown, this metapixel is comprised of a 3×3 array of individual pixels; within the array, liquid colorant has been applied to each pixel. To each of the "border" pixels an excessive quantity of a first colorant (Colorant A) has been applied—107% of the absorbent capacity of the substrate contained within the area of the pixel—thereby oversaturating each of these border pixel areas. To the central pixel, a quantity of a second colorant (Colorant B) has been applied that corresponds to 45% of the absorptive capacity of the substrate contained within the area of the pixel, meaning that the central pixel area has been substantially undersaturated. Note that, across the metapixel, the average saturation level is 100%. The colors of Colorants A and B preferably are chosen to allow for the maximum number of perceived colors to be reproduced. However, it is contemplated that a given set of colorants may include a "colorant" that is merely a diluent and imparts no perceptible color of its own.

Figure 1C:
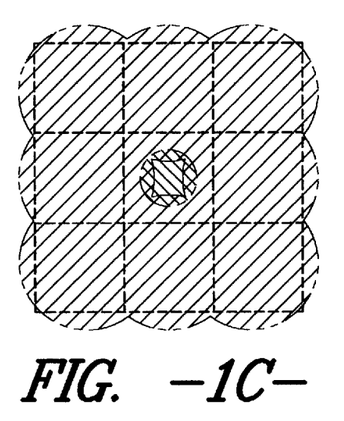

Because of the relative quantity of colorants applied, there is a net migration of Colorant A from the areas of oversaturation (the border pixel areas) to the area of undersaturation (the central pixel area). As qualitatively and approximately depicted in FIG. 1C, the result is a corresponding physical blending of the respective colorants within the central pixel area, particularly within the area near the perimeter of the central pixel area. There is also an effective contraction, to the central portion of the center pixel area, of the region in which relatively unblended Colorant B is found. Under the control of a skillful designer, this contracted region, together with the surrounding blended area, can be made to mimic the 5% dot size depicted in FIG. 1A when viewed at a distance.

Figure 1D:
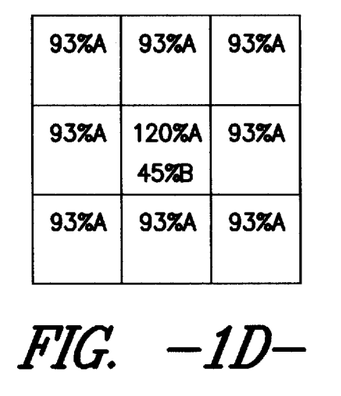

FIG. 1D represents the construction of an alternative 3×3 metapixel that will result in the same proportion of colorants added to the substrate, but will yield a different "look." In FIG. 1D, Colorant A has been applied to the "border" pixels at a 93% saturation level. The central pixel has been targeted with two applications of colorant: a 120% quantity of Colorant A and a 45% quantity of Colorant B. The net migration again is from the oversaturated areas (here, occupied by the central pixel) to the undersaturated areas (here, occupied by the border pixels). The physical blend of Colorant A and B from the central pixel area will tend to migrate outwardly into the surrounding border pixel areas, resulting in the physical blending of colorants both in the central pixel area and, to a lesser extent, in the areas of the border pixels immediately adjacent to the central pixel area. This result is diagrammatically approximated in FIG. 1E. The relative proportion of Colorants A and B are exactly the same as in FIG. 1C, and a 100% average saturation level is again achieved, but the overall visual effect, as viewed from relatively close range, will be different. As will be made clear, these two 3×3 metapixels are by no means the only metapixels that can be constructed to yield the desired perceived color. Other metapixels, larger, smaller, or the same size, may be constructed, each yielding a slightly different, perhaps aesthetically important, rendition of the image, particularly in terms of color texture (e.g., heather).

The series of diagrams comprising FIG. 2 are intended to show a simulation, using metapixels of various constructions, of a pixel carrying a "20% area" colorant. As indicated, FIG. 2B is a 3×3 metapixel in which the net migration is designed to be outward from the central pixel area, and results in the colorant distribution roughly depicted in FIG. 2C. FIG. 2D is another 3×3 metapixel, but one in which the net migration is designed to be into the center and corner pixel areas from the remaining opposing, oversaturated pixel areas, and results in the colorant distribution diagrammatically approximated in FIG. 2E. FIGS. 2F and 2G continue this paired sequence, with the notable difference that the metapixel is comprised of only four individual pixels, in a 2×2 configuration. It should be noted that, while FIGS. 2C, 2E, and 2F do not appear to be similar to FIG. 2A or to each other, they nevertheless can generate substantially equivalent perceived colors when viewed at a distance.

For purposes of convenience, the number of constituent pixels comprising a given metapixel shall be referred to as the "order" of the metapixel. Accordingly, the metapixels of FIGS. 2B and 2D can be referred to as "ninth order" metapixels, and the metapixel of FIG. 2F shall be referred to as a "fourth order" metapixel. Because of the need for pixel-to-pixel migration of colorant within the metapixel, a "second order" metapixel, containing two pixels, is the lowest order possible.

Figure 3:
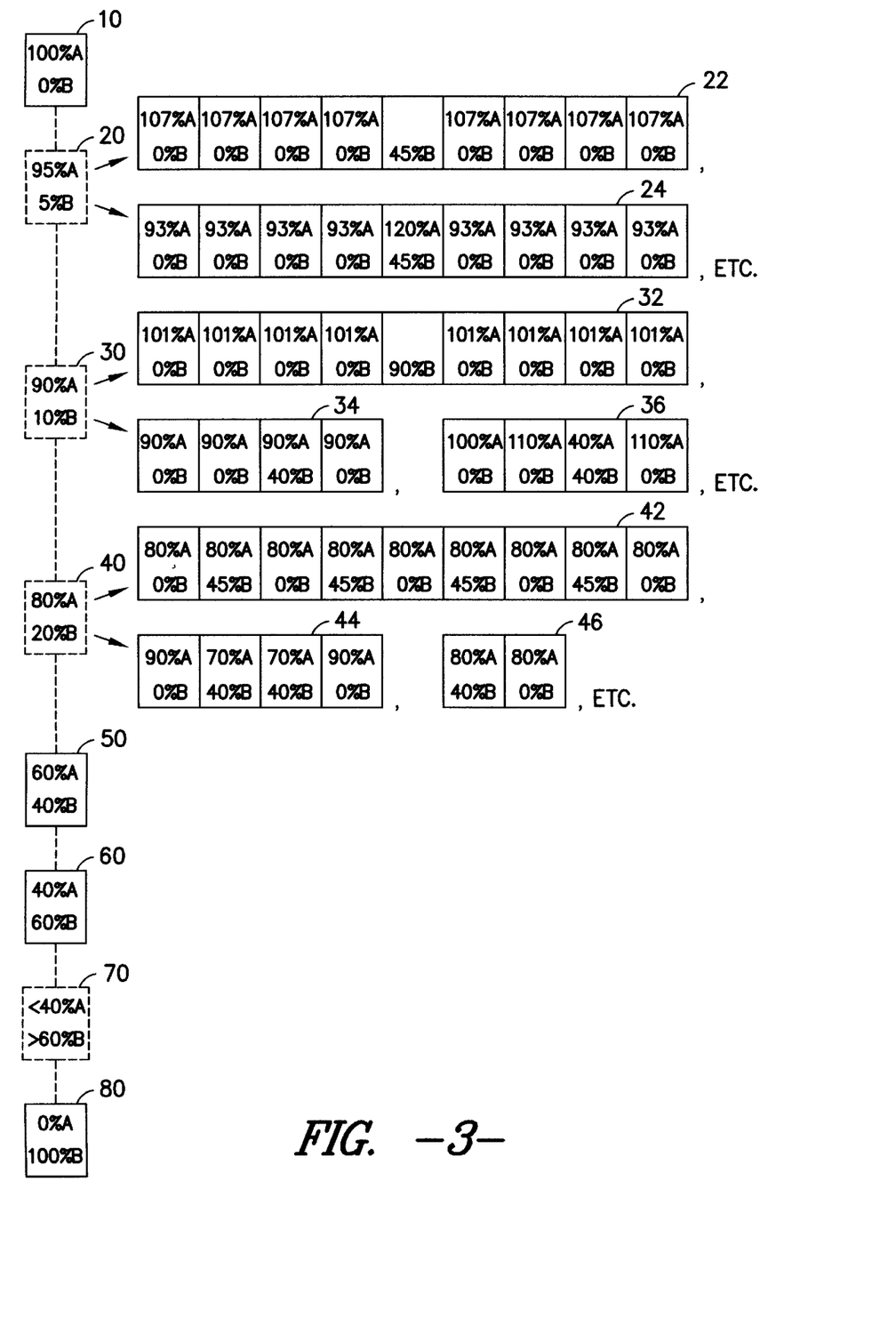
FIG. 3 depicts the theoretical palette of a printing system using two different colors at 100% saturation levels by specifying the pixel-by-pixel composition of various different metapixels that effectively simulate several different color combinations.

FIG. 3 diagrammatically depicts the potential increase in colors that may be reproduced using various arrangements of metapixels using only two colorants, A and B, on the printing system assumed above. The solid frames 10, 50, 60, and 80 to the left in FIG. 3 represent single pixels containing some of the colors that ordinarily would be available to the designer without the use of metapixels. Note particularly that, between the frame 10 labeled "100% A" (indicating a 100% saturating quantity of Colorant A) and the frame 50 marked "60%A+40%B" (indicating a single, 100% saturated pixel containing a 60% saturating quantity of Colorant A and a 40% saturating quantity of Colorant B), there are no solid frames. This is because a pixel having any color between the indicated frames would require delivery to that individual pixel of a quantity of Colorant B below the 40% level, which cannot be achieved with the assumed colorant application system. Although some of these colors may be achievable using compound pixel techniques, with their attendant shortcomings, many colors would remain unavailable.

If, in accordance with the teachings herein, the use is made of metapixels exhibiting selective oversaturation/undersaturation of individual pixels and pixel-to-pixel migration of colorants, then the range of colors that can be reproduced with only two colorants "A" and "B" is increased dramatically, as symbolized by dotted frames 20, 30, 40, and 70 in FIG. 3. These dotted frames do not represent individual pixels, but instead represent the perceived color of a metapixel comprised of the pixels indicated to the right of the dotted frame. The three color blends indicated in frames 20, 30, and 40 would ordinarily require the application of Colorant B to an individual pixel at respective levels of 5%, 10%, and 20%—levels that are not possible because they fall below the 40% threshold of the application system, and are therefore "unavailable" colors. However, each of these unavailable colors can be derived by the construction of one or another of the corresponding metapixels specified to the right of the respective dotted frame.

For example, printing a color that would require construction of a single pixel containing 95% Colorant A and 5% Colorant B, as indicated by dotted frame 20, can be effectively simulated by construction a metapixel comprised of eight pixels containing Colorant A at the 107% saturation level and a single pixel containing Colorant B at the 45% saturation level, as depicted at 22 (and as shown in FIG. 1B). The indicated 107% oversaturation of Colorant A in eight of the pixel areas results in the migration of Colorant A from these pixel areas into the pixel area containing Colorant B at the 45% (undersaturated) level (as was shown and discussed in connection with FIG. 1C). The net migration results in a colorant blend that yields essentially the same perceived color as would have resulted from the application of Colorant A at the 95% saturation level and Colorant B at the 5% saturation level within the area occupied by the metapixel.

Figure 1E:
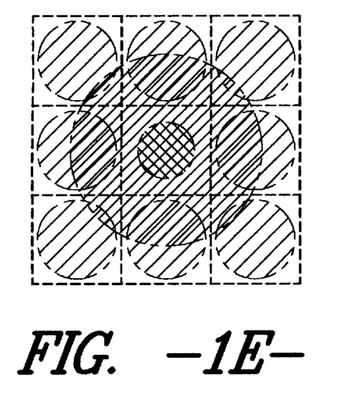

As one of several alternatives, a metapixel can be used that is comprised of eight pixels containing a 93% saturation level of Colorant A and one adjoining or contiguous pixel containing a 120% saturation level of Colorant A and a 40% saturation level of Colorant B (as specified at 24 and shown in FIG. 1D). The resulting 160% oversaturation level results in the migration of the Colorant A/Colorant B mixture in that pixel area into the adjoining pixel areas containing a sub-saturating level of 93% Colorant A, as depicted in FIG. 1E. Depending upon the number of individual pixels chosen to comprise the metapixel and the specific levels of saturation within those selected pixels, a variety of different metapixels can be constructed that will result in the equivalent overall perceived color as the two metapixels described above.

Note that pixel sequences 22, 24, 32, 34, 36, 42, 44, and 46 merely comprise a "list" of the constituent pixels in a metapixel that could be used to simulate the indicated color blend, and have been arranged in a linear array only for diagrammatic convenience. In reality, these constituent pixels most likely would be configured within the metapixel in a more compact form, such as a square, rectangle, hexagon, triangle, or the like, so as to accommodate arrangement on the substrate surface in a "tiled" manner (i.e., contiguous placement, with no gaps).

Continuing with the other color combinations depicted in FIG. 3, dotted frame 30 indicates a simulated pixel containing Colorant A at the 90% saturation level and Colorant B at the 10% saturation level. This can be simulated by, among others, the different metapixels represented by the pixel sequences at 32, 34, and 36. In sequence 32, a "ninth order" (i.e., comprised of nine individual pixels) metapixel is represented in which the eight pixel areas carrying Colorant A are slightly oversaturated and the one pixel area carrying Colorant B is nearly saturated. This would result in a net colorant migration of Colorant A into the Colorant B pixel area to achieve the desired perceived color. In sequence 34, representing a "fourth order" (i.e., comprised of four individual pixels) metapixel, the same perceived color can be achieved with all four pixel areas carrying Colorant A at the 90% saturation level, and with one of the four pixel areas carrying, in addition, Colorant B at the 40% saturation level (meaning that pixel would be oversaturated at the 130% level with the combined quantities of colorants). In this case, the net migration of colorant would be from the single oversaturated pixel area (Colorant A+Colorant B) to the surrounding undersaturated pixel areas (Colorant A only).

If artistic considerations so demand, an equivalent fourth order metapixel can be constructed as specified by sequence 36, with two pixel areas carrying Colorant A at the 110% level, a third pixel area carrying Colorant A at the 100% level, and the fourth pixel area carrying a combination of Colorant A at the 40% level and Colorant B at the 40% level. This would result in a net migration into the undersaturated pixel area containing the combination of Colorant A and Colorant B, and, as in both earlier cases, would yield an overall colorant distribution corresponding to Colorant A at the 90% level and Colorant B at the 10% level and an overall colorant saturation level of 100%.

It is contemplated that, due to the nature of the colorant migration, the distributions of various colorants within different "equivalent" metapixels (i.e., metapixels having substantially identical overall colorant composition, but different individual pixel construction) will result in slightly different visual effects for each metapixel design. For example, if one of the colors is much darker than the other and happens to be concentrated within certain pixels, arranging the placement of that color along the edge or diagonal of a 3×3 or a 2×2 array might yield an artistically significant overall diagonal pattern to the metapixel (see the diagonal pattern shown in FIG. 2G) that, when reproduced within a given area, might be helpful in further defining a border, shadow detail, or other element of the image. It is also contemplated that, for aesthetic reasons, the relative position of one or more pixels within the metapixel may be varied. To choose a different metapixel for illustration, the pixel sequence 34 specifies a fourth order metapixel in which one of the four pixels contains 130% colorant. For aesthetic reasons, it may be desirable to move the relative position within the metapixel of that oversaturated pixel from quadrant to quadrant as the metapixel is replicated on the substrate. This, for example, could result in the placement of four adjoining fourth order metapixels forming a 4×4 array in which the four individual oversaturated pixel areas are centrally arranged in a 2×2 array or, alternatively, are diagonally arranged to define the corners of the 4×4 metapixel.

The color blend depicted at 40 in FIG. 3 is shown with three of many possible metapixel specifications. If a ninth order metapixel is desired, the pixel sequence specified at 42 is one of several that may be used. If a fourth order metapixel is desired, the pixel sequence shown at 44, among other possibilities, is available. If, for example, the pattern to be reproduced is highly detailed, a second order metapixel may be used, such as that as defined at 46. All of these combinations, in general, will be effective in generating the desired perceived color, but each will have, on close inspection, a characteristic "look." That the same color may be simulated through many different combinations of pixels and saturation levels, as artistic demands dictate, is regarded at a major advantage of this invention.

It should be understood that, while only three blends or simulated colors were discussed in this example, the range of "new" colors available using metapixels is far greater—all the colors having Colorant B levels below 40% and all colors corresponding to Colorant A levels below 40%, symbolized by dotted frame 70. Adding available colorants beyond the minimum two colorants assumed above (by using more than two colorant arrays) causes the number of previously unavailable colors that can be simulated using metapixels to grow geometrically. Accordingly, use of six or eight available colorants can result in the availability of thousands of colors that were previously unavailable. While some of the above unavailable colors might be simulated by skillful use of compound pixels of the prior art, many colors simply would not be available because no pixel-to-pixel blending takes place. Additionally, the use of compound pixels would be far more likely to generate undesirable patterning artifacts, perhaps due to the substantially non-blended nature of the pixel-to-pixel interface that is characteristic of the compound pixel.

Although the characteristics and anomalies of the migration process can result in non-uniform blending within the metapixel, and therefore may occasionally generate patterning artifacts, it is probable that an alternative metapixel construction (including alterations to metapixel size, color selection, internal arrangement, etc.) and thoughtful placement of such metapixels can minimize or eliminate any such problem. Because of the extraordinary control this invention provides over the perceived color and the way it is printed, these anomalies actually can become a desired ingredient in applications where additional edge definition or other artistic effect is desired, as discussed above.

It is contemplated that the construction of a metapixel can result in the displacement of one or more of the constituent colorants without significant visually apparent blending taking place. This is particularly true if the chosen substrate has significant depth, for example, a pile fabric or carpet, or if there is a dramatic difference in the appearance of the colorants, e.g., one is very pale and another is very dark.

Because textile substrates, due to their characteristically high absorption capacity, typically allow significant migration of colorants into the substrate, as opposed to merely in a lateral direction on the surface of the substrate, and because the colorants used with such substrates can be engineered with respect to their migration characteristics, it is believed all the opportunities afforded by the use of metapixels have not been shown or suggested by the foregoing. The embodiments of this invention will have utility in the generation of single or multi-colored patterns wherever (1) it is desired to print an image on an absorbent substrate using liquid colorants, (2) the printed image is an assemblage of discrete pixels, each containing one or more colorants, and (3) it is necessary, in order to produce a desired perceived color, to apply less colorant to certain pixels than the printing method can satisfactorily deliver to the substrate.

It should be understood to those skilled in the art that the invention can be modified in arrangement and detail without departing from such principles, and that all such modifications falling within the spirit and scope of the following claims are intended to be protected hereunder.

What is claimed:

1. A pattern element on the surface of an absorbent substrate for use in printing images with liquid colorants, said pattern element comprising a first pixel area on said substrate surface and a second, adjoining pixel area on said substrate surface, said first pixel area having received a quantity of a first liquid colorant and said second pixel area having received a quantity of a second liquid colorant, said respective quantities of colorants having been sufficient to cause intended migration, on said substrate surface, of a portion of said first liquid colorant from said first pixel area to said second, adjoining pixel area, said colorant migration into said second pixel area forming a colorant migration area within said second pixel area that, in conjunction with said first and said second pixel areas, comprises an area that, in conjunction with said first and said second pixel areas, comprises an area on said substrate surface that produces a desired perceived color on said substrate surface.

2. The pattern element of claim 1 wherein said quantity of said first liquid colorant applied to said first pixel area was sufficient to oversaturate the substrate associated with said first pixel area, and the quantity of said second liquid colorant applied to said second pixel area was insufficient to saturate fully the substrate surface associated with said second pixel area.

3. The pattern element of claim 2 wherein said absorbent substrate is a pile fabric.

4. The pattern element of claim 3 wherein said pile fabric is carpet.

5. The pattern element of claim 1 wherein said absorbent substrate is a pile fabric.

6. The pattern element of claim 5 wherein said pile fabric is carpet.

7. A pile fabric having thereon the pattern element of claim 1.

8. The pile fabric of claim 7 wherein said pile fabric is carpet.

9. The pile fabric of claim 7 wherein said first pixel area, prior to having received said quantity of said first liquid colorant, already contains a liquid colorant capable of mixing with said quantity of said first colorant.

10. The pile fabric of claim 9 wherein said pile fabric is carpet.

11. The pile fabric of claim 7 wherein said second pixel area, prior to having received said quantity of said second colorant, already contains a liquid colorant capable of mixing with said quantity of said second colorant.

12. The pile fabric of claim 11 wherein said pile fabric is carpet.

13. A method for forming a pattern element on an absorbent substrate for use in printing an image using liquid colorants, said pattern element being comprised of at least two adjoining pixels on said substrate surface, said method comprising:
   a) forming a first pixel comprising said pattern element by applying a quantity of a first liquid colorant to a first pixel area on said substrate surface, said quantity of said first liquid colorant being sufficient to oversaturate said substrate surface within said first pixel area
   b) forming a second pixel comprising said pattern element by applying a quantity of a second liquid colorant to a second pixel area on said substrate surface, said second pixel area being adjoining said first pixel area, said quantity of said second liquid colorant being insufficient to saturate fully said substrate surface within said second pixel area;
   c) allowing a portion of said first liquid colorant in said first pixel area to migrate to said second pixel area, thereby causing said migrated portion of said first liquid colorant to mix with said second liquid colorant in said second pixel area.

14. The method of claim 13, wherein said first pixel area already contains, prior to the application of said quantity of said first liquid colorant, a liquid colorant capable of mixing with said quantity of said first liquid colorant.

15. The method of claim 13, wherein said second pixel area already contains, prior to the application of said quantity of said second liquid colorant, a liquid colorant capable of mixing with said quantity of said second liquid colorant.

16. The method of claim 13 wherein said absorbent substrate is a pile fabric.

17. The method of claim 16 wherein said pile fabric is carpet.

18. A method for printing an image on the surface of an absorbent substrate using a liquid colorant, said image being comprised of a plurality of pixel groups on said substrate surface, each pixel group being comprised of at least two adjoining pixels, said method comprising:
   a) forming a first pixel group by applying a quantity of a first liquid colorant to a first pixel area on said substrate surface, said quantity of said first liquid colorant being sufficient to oversaturate said substrate surface within said first pixel area, and applying a quantity of a second liquid colorant to a second pixel area, adjoining said first pixel area, said quantity of said second liquid colorant being insufficient to saturate fully said substrate surface within said second pixel area;
   b) allowing said first liquid colorant in said first pixel area to migrate to said second pixel area, thereby causing said first liquid colorant to mix with said second liquid color within said second pixel area, and forming a physically blended color within said first pixel group;
   c) forming a second pixel group, adjoining said first pixel group, by applying a quantity of a third liquid colorant to a third pixel area on said substrate surface, said quantity of said third liquid colorant applied to said third pixel area being sufficient to oversaturate said substrate surface within said third pixel area and applying a quantity of a fourth liquid colorant to a fourth pixel area, said fourth pixel area adjoining said third pixel area, said quantity of said fourth liquid colorant applied to said fourth pixel area being insufficient to saturate fully said substrate surface within said fourth pixel area;

d) allowing said third liquid colorant in said third pixel area to migrate to said fourth pixel area, thereby causing said third liquid colorant from said third pixel area to mix with said fourth liquid color within said fourth pixel area, and forming a physically blended color within said second pixel group.

19. The printing method of claim 18 wherein said first liquid colorant and said third liquid colorant have the same intrinsic color.

20. The printing method of claim 18 wherein said second liquid colorant and said fourth liquid colorant have the same intrinsic color.

21. The printing method of claim 18 wherein said first liquid colorant from said first pixel area also migrates to said second pixel group.

22. The printing method of claim 18 wherein said physically blended color within said first pixel group migrates to said second pixel group and mixes with at least one of the colorants within said second pixel group.

23. The method of claim 18 wherein said liquid colorants are applied to said pixel areas on said substrate surface in the form of liquid streams directed onto the surface of said substrate, said streams being selectively interrupted in accordance with electronically supplied patterning information.

24. The method of claim 23 wherein said absorbent substrate is a pile fabric.

25. The method of claim 24 wherein said pile fabric is carpet.

26. The method of claim 18 wherein said absorbent substrate is a pile fabric.

27. The method of claim 26 wherein said pile fabric is carpet.

28. The pile fabric having the image produced by the method of claim 26.

29. The carpet having the image produced by the method of claim 27.

30. A method for forming an image on an absorbent substrate by forming on the surface of said substrate a plurality of pattern elements in a tiled array, at least one of said pattern elements being formed by:

a. defining on said substrate surface a first pixel area and a second pixel area, said first area and said second area being adjoining;

b. applying to said first pixel area on said substrate surface a quantity of a first liquid colorant, said quantity of said first colorant being more than sufficient to saturate said substrate surface in said first area;

c. applying to said second pixel area on said substrate surface a quantity of a second colorant, said quantity of said second colorant being less than sufficient to saturate said substrate surface in said second area;

d. allowing a portion of said first liquid colorant to migrate from said first pixel area to said pixel second area and mix with a portion of said second colorant in said second pixel area.

31. The method of claim 30 wherein said absorbent substrate is a pile fabric.

32. The method of claim 31 wherein said pile fabric is carpet.

33. A liquid-absorptive textile substrate having a surface that has been printed in a pattern configuration by the application of a first liquid colorant and a second liquid colorant, said pattern being formed at least in part by a plurality of individually similar pattern elements arranged in a tiled array within at least a portion of said pattern, each pattern element being comprised of a first pixel area to which a quantity of said first liquid colorant has been applied, thereby forming a first color on said substrate in said first pixel area, and a second pixel area to which a quantity of said second liquid colorant has been applied, thereby forming a second color on said substrate in said second pixel area, said first pixel area and said second pixel area being adjoining, and wherein a portion of said first liquid colorant has migrated from said first pixel area to said second pixel area and mixed with a portion of said second colorant in said second pixel area, thereby forming a colorant migration area within said second pixel area having a third color that is a mixture of said first color and said second color, said third color, in conjunction with said first and said second colorants in their first and second respective pixel areas, defining an area on said substrate surface that produces a desired perceived color on said substrate surface.

34. The textile substrate of claim 33 wherein said textile substrate is a pile fabric.

35. The textile substrate of claim 34 wherein said pile fabric is carpet.

36. A pile fabric having thereon a pattern element that produces a perceived color, said pattern element comprising a first pixel area and a second pixel area, said first pixel area having received an oversaturated quantity of a first colorant; said second pixel area adjoining said first pixel area, said second pixel area having received an undersaturated quantity of a second colorant, said undersaturated quantity of said second colorant being not less than 40% of the saturation level of said second pixel area; said pattern element having a third color formed by the physical blending of said first colorant with said second colorant, said physical blending caused by migration of said first colorant from said first pixel area into said second pixel area wherein it has mixed with a portion of said second colorant.

37. The pile fabric of claim 36 wherein said pile fabric is carpet.

* * * * *